June 10, 1958  C. T. BREWER  2,837,980
APPARATUS FOR TRUNCATING CONICAL CUPS
Filed July 7, 1954  8 Sheets-Sheet 1

INVENTOR
CLARENCE T. BREWER
BY
ATTORNEY

June 10, 1958 — C. T. BREWER — 2,837,980
APPARATUS FOR TRUNCATING CONICAL CUPS
Filed July 7, 1954 — 8 Sheets-Sheet 3

INVENTOR.
CLARENCE T. BREWER
BY *Luther W. Hawley*
ATTORNEY

June 10, 1958 — C. T. BREWER — 2,837,980
APPARATUS FOR TRUNCATING CONICAL CUPS
Filed July 7, 1954 — 8 Sheets-Sheet 4
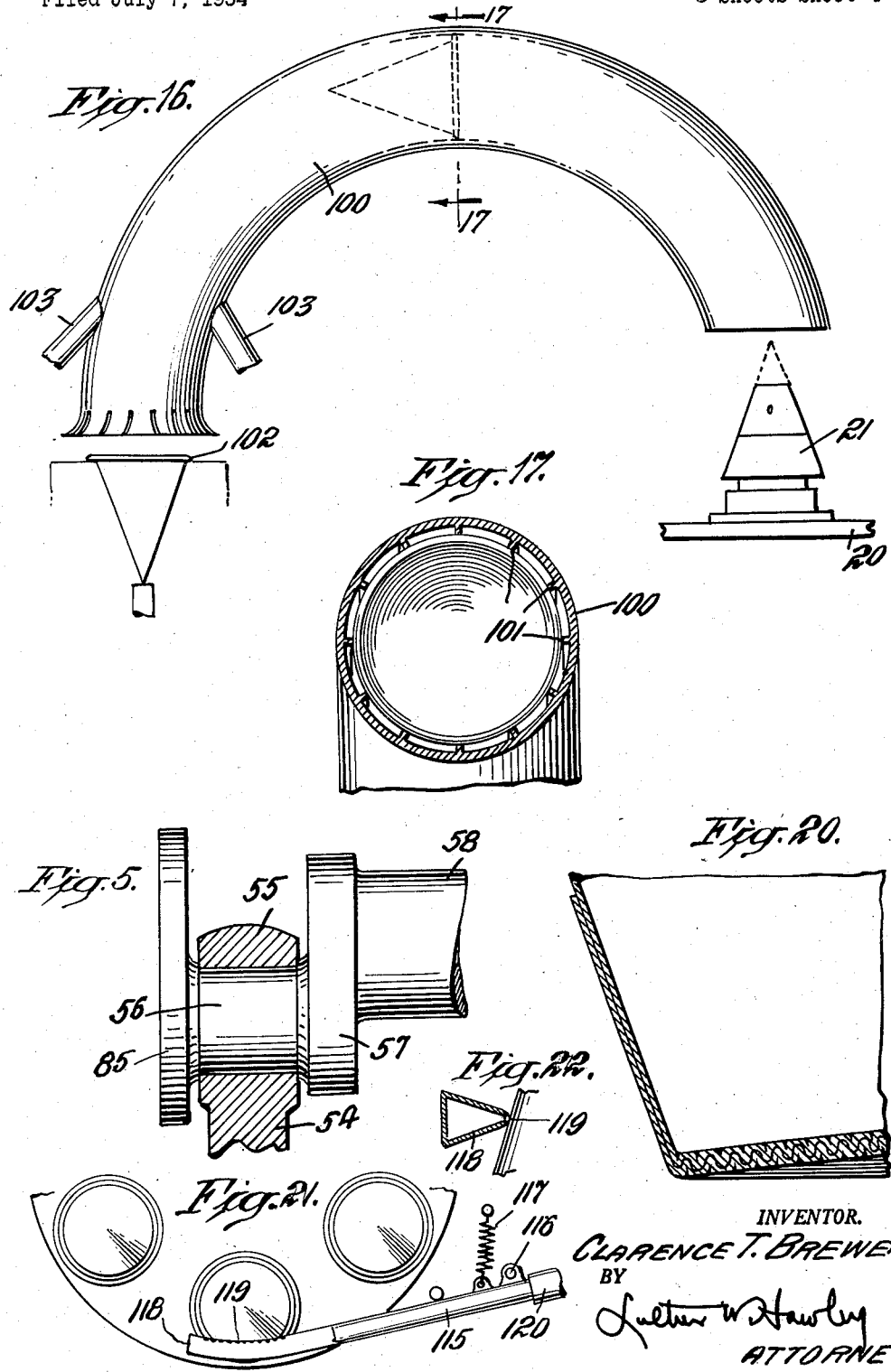
INVENTOR.
CLARENCE T. BREWER
BY
Luther W. Hawley
ATTORNEY

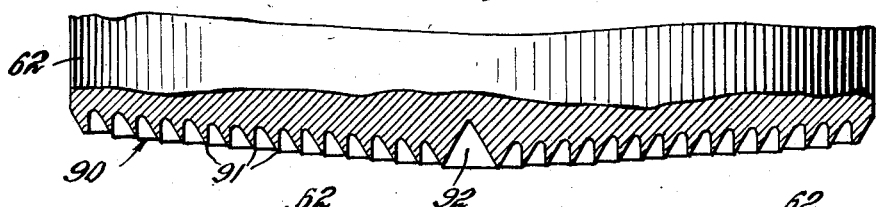
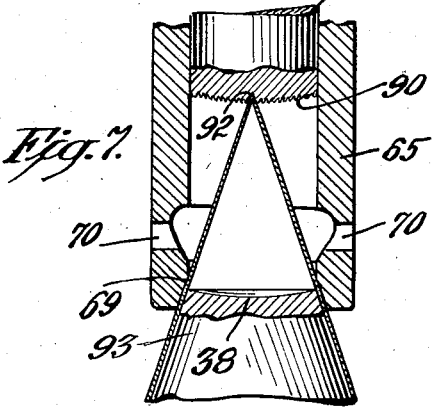
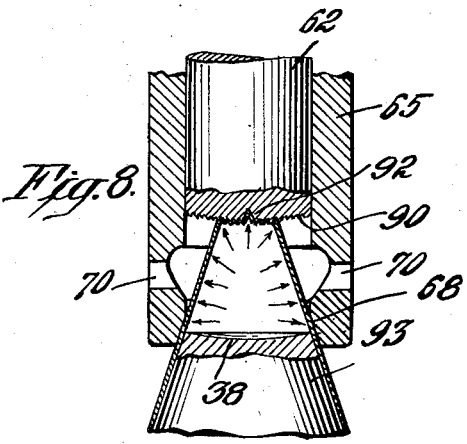
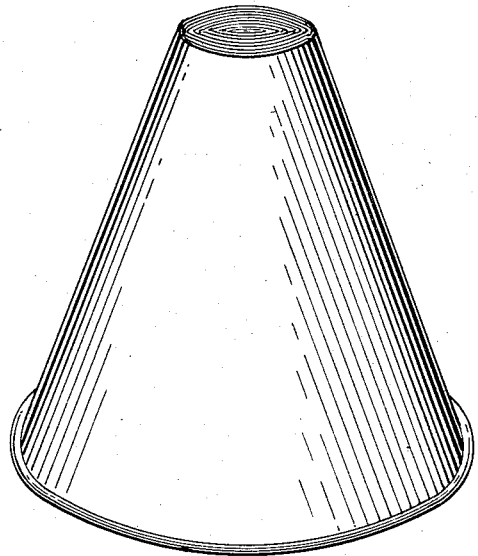
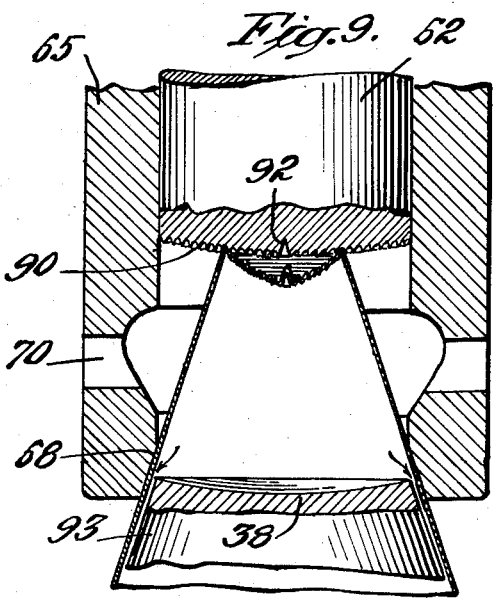

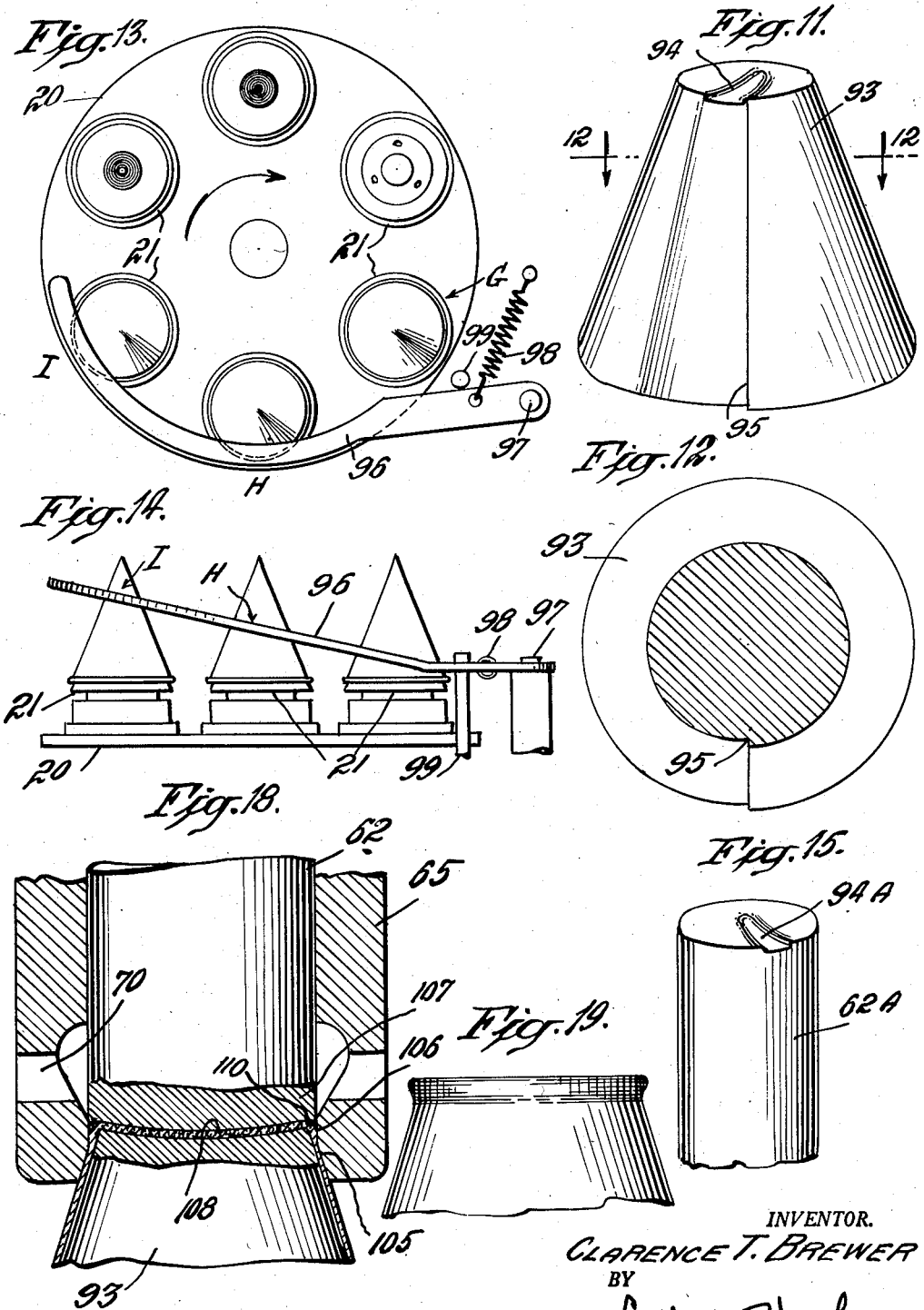

INVENTOR.
CLARENCE T. BREWER
BY
Luther W Hawley
ATTORNEY

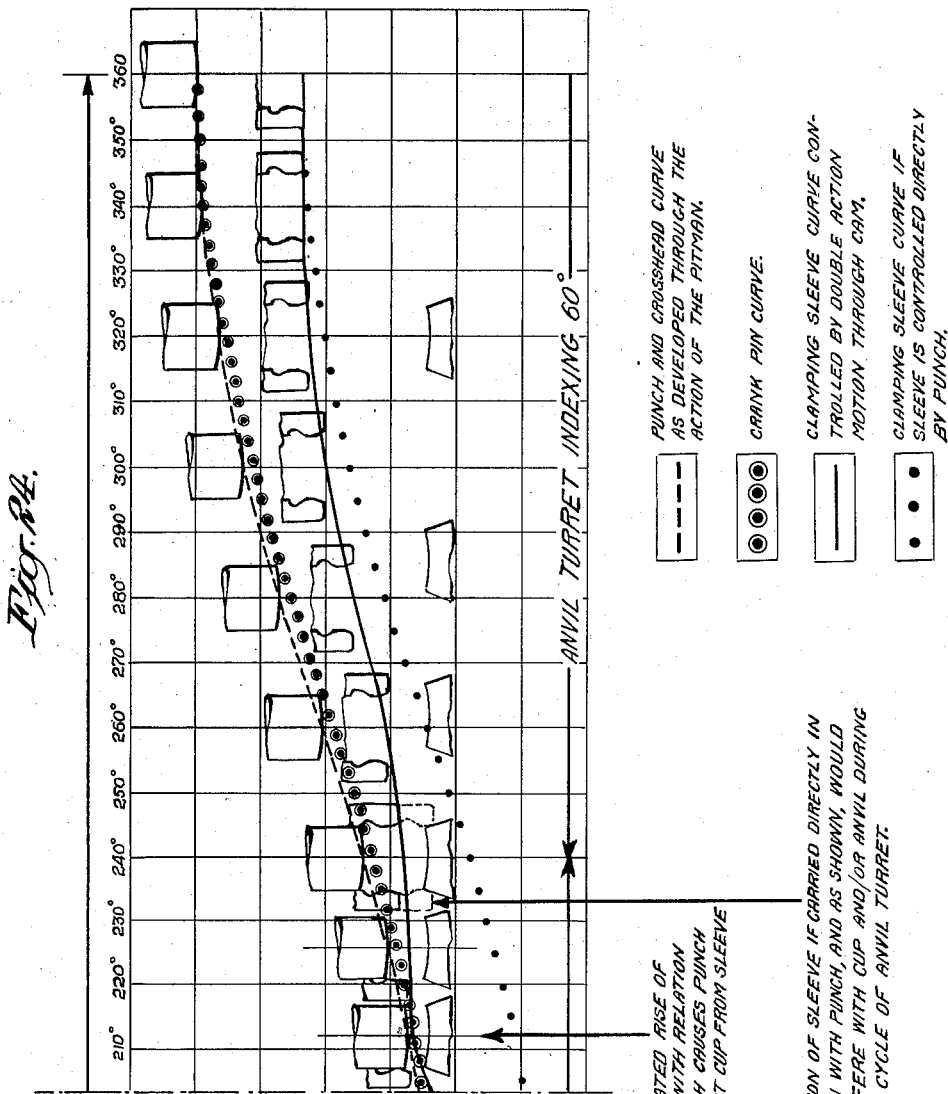

United States Patent Office 2,837,980
Patented June 10, 1958

2,837,980

APPARATUS FOR TRUNCATING CONICAL CUPS

Clarence T. Brewer, Oak Park, Ill., assignor, by mesne assignments, to American Can Company, New York, N. Y., a corporation of New Jersey Application July 7, 1954, Serial No. 441,821

11 Claims. (Cl. 93—36.1)

This invention relates to an apparatus for truncating conical cups.

Such cups, as commonly manufactured and used, have sharp pointed ends. Attempts have been made to blunt or round the ends but such blunted or rounded ends have not been entirely satisfactory since the compressed ends or folds or creases therein are uneven and, furthermore, tend to sag and open up and leak due to the weight of the liquid. To overcome this tendency, cup holders have been provided with bottom supports.

Various forms of apparatus have been developed for this purpose but they have not been entirely satisfactory nor have they produced a bottom with even folds that is neat in appearance or has uniform strength, or a bottom that is self-supporting. Moreover, certain types of such apparatus are complicated in construction and operation, such as those using telescoping tubes or sleeves, and such apparatus tends to form creases or folds which tend to crack.

This invention has for its salient object to provide simple and practical apparatus for truncating the apexes of conical cups in such a manner as to form a self-supporting bottom having uniform strength throughout the truncated area.

Another object of the invention is to provide apparatus for truncating the bottom of a conical cup in such a manner that the cup bottom will be strong and will not sag under pressure of the liquid therein.

Another object of the invention is to provide apparatus for truncating the bottoms of conical cups, so worked out that uniform folds or pleats will be formed therein proportional to the thickness of the material folded.

Another object of the invention is to provide apparatus for blunting or truncating the apexes of conical cups, so constructed and so worked out that the cup wall is positively circumferentially supported and controlled during the pleating or folding operation so that regular circumferential pleats or folds will be formed therein.

Another object of the invention is to provide apparatus for blunting or truncating the apexes of conical cups, so constructed and so worked out that the cup wall will be folded evenly and held in circumferential control during the folding and compressing operation.

Further objects of the invention will appear from the following specification taken in connection with the drawings which form a part of this application and in which Fig. 1 is an elevational view, partly in section, illustrating truncating mechanism constructed in accordance with the invention, with the cross head and punch mechanism in closed position;

Fig. 5 is a fragmentary elevational view, partly in section, showing the pitman driving connections;

Fig. 6 is an enlarged sectional elevation of the lower end of the punch;

Figs. 7, 8 and 9 are sectional elevations showing the clamping sleeve and punch and the operation of the punch in truncating the bottom;

Fig. 10 is a perspective elevational view of a truncated cup;

Fig. 11 is a perspective elevation of a modified form of anvil;

Fig. 12 is a transverse sectional elevation taken substantially on line 12—12 of Fig. 11, looking in the direction of the arrows;

Fig. 13 is a plan view showing the turret table, cup supports or anvils thereon, and means for positioning the cups on the anvils;

Fig. 14 is an elevational view taken at right angles to Fig. 13;

Fig. 15 shows a modified form of punch face;

Fig. 16 is an elevational view showing the chute for delivering the conical cups from the cup machine to the truncating mechanism;

Fig. 17 is a sectional elevation taken substantially on line 17—17 of Fig. 16, looking in the direction of the arrows;

Fig. 18 is a sectional elevation illustrating a slightly modified form of clamping sleeve;

Fig. 19 is an elevational view of the upper end of a cup truncated by the punch and clamping sleeve shown in Fig. 18;

Fig. 20 is a sectional view of the truncated bottom;

Fig. 21 is a fragmentary plan view similar to Fig. 13, showing a modified form of cup positioning arm or lever;

Fig. 22 is a fragmentary sectional elevation taken through the arm shown in Fig. 21;

Fig. 24 is a view similar to Fig. 23 but showing the punch and clamp positions through the rest of the cycle of operation.

Figure 1:
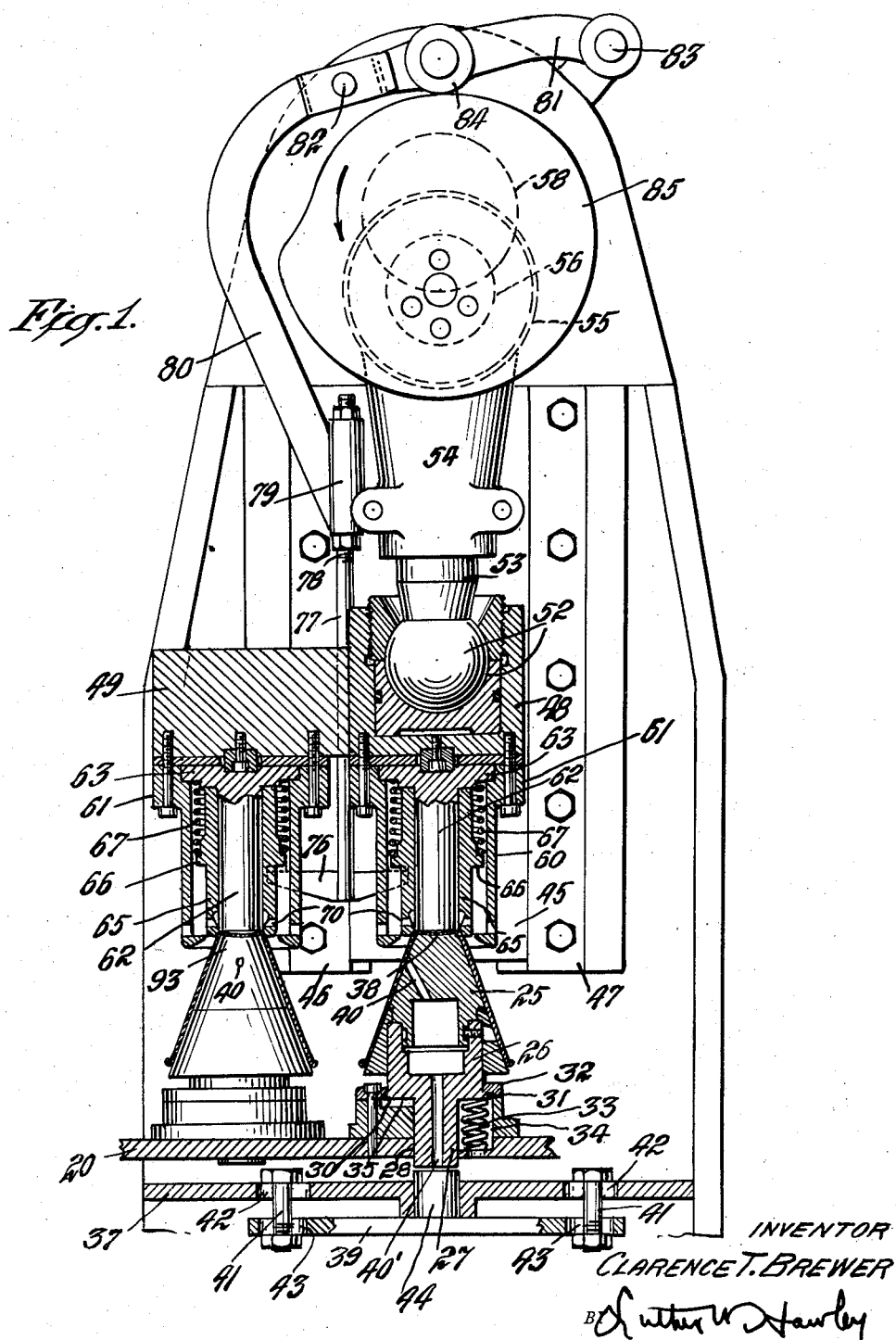

In the particular embodiment of the machine illustrated in the drawings, there is shown a turret table 20 having a plurality of cup supports or anvils 21 mounted radially thereon at stations designated A, B, C, D, E and F. The turret is rotated progressively intermittently, one station at a time, to dispose the cup supports or anvils in the various stations. At station A the conical cups are received from the cup machine. Station B is idle. At stations C and D the blunting or truncating operation is performed. At station D the second stage of the blunting or finishing operation is performed. Station E is idle. At station F the blunted cups are ejected from the machine.

The blunting and finishing operations which, as above stated, are performed at stations C and D, are illustrated particularly in Figs. 1 to 4 inclusive. The cup support consists of an anvil 25 which is mounted on a cylindrical support 26 having a reduced extension 27 vertically movable in an opening 28 in the turret table 20. The support 26 has an annular outwardly extending flange 30, which in conjunction with a flange 31 on the upper end of a housing 32, limits the upward movement of the support and anvil under the action of springs 33 mounted in the housing 32 and seated at one end in recesses 34 in the turret table and at the other end against a surface 35 of the support 26. Thus a limited vertical movement biased by the springs 33 is permitted.

The springs 33 allow sufficient spring biased movement of the anvil for the pressure on the cup apex exerted at the preforming or initial blunting stage C. However, at the finishing stage D much heavier pressure is exerted and in order to take care of this added pressure additional spring biased means is provided. This is shown at the bottom of Fig. 1. Here a bed plate or base anvil 37 is shown. A spring bar or deflection bolster 39 is supported beneath the anvil 37 by bolts 41, the bed plate or anvil 37 having slots 42 and the bar having slots 43 for the bolts. A stud 44 is slidable in an opening in the base anvil 37 and rests on the bar 39. As the extra pressure on the anvil 25 is applied at station D, the bottom 27 of the anvil 25 presses downwardly on the stud 44, and this pressure is taken care of by the spring bar 39. By adjusting the bolts 41 in the slots the effective length of bar 44 can be varied.

The anvil 25 has its upper surface 38 so formed as to give the desired shape to the blunted bottom of the cup and in the form of the invention shown this surface is spherical and concave, although it may be spherical and convex, if desired. The anvils 25 have air conduits or passages 40 through which a vacuum is applied at station A where the cups are received and through which air is blown to eject the cups at station F. At station A passage 40 communicates through the opening 40' in anvil 25 with a vacuum pipe, and at station F these passages communicate with an air blast pipe.

The conical cups are fed to the station A from the cup machine, in which station the cup is mounted on the anvil disposed at the station. Thereafter, a punch is lowered from a position above the apex of the cup and first engages the apex and thereafter successively engages the cup wall to fold the cup inwardly and downwardly, forming corrugations which are finally compacted against the upper surface of the anvil. This is accomplished in the following manner.

The truncating or blunting operation may be carried out in two stages, depending on the finish desired, and is performed, when carried out in two stages, at stations C and D. Above these stations there is mounted a punch housing comprising a vertically movable cross head 45 which operates in vertical guide members 46 and 47 which form a dove-tail slide. The cross head 45 has secured thereto a housing 48, to which is secured a housing 49. The cross head 45 and housing 48 are operated by a ball and socket connection 52 to an adjustable pitman 53. A sleeve 54 is adjustably connected to and forms a part of the pitman and on the upper end of the sleeve there is formed a hub 55 which is mounted on a crank pin 56. The crank pin 56 is carried by a crank 57 mounted on a shaft 58. As the shaft is rotated, the crank will rotate about the axis of the shaft and the pitman will oscillate and move vertically to reciprocate the cross head 45.

Since the punches which perform the first and second blunting and finishing operations are operated in exactly the same manner and simultaneously at stages C and D, the vertical movement of the cross head 45 and housings 48 and 49 which carry the punches are identical. These housings also carry the clamps for clamping the cups to the anvil during the truncating and finishing operations.

Figure 2:
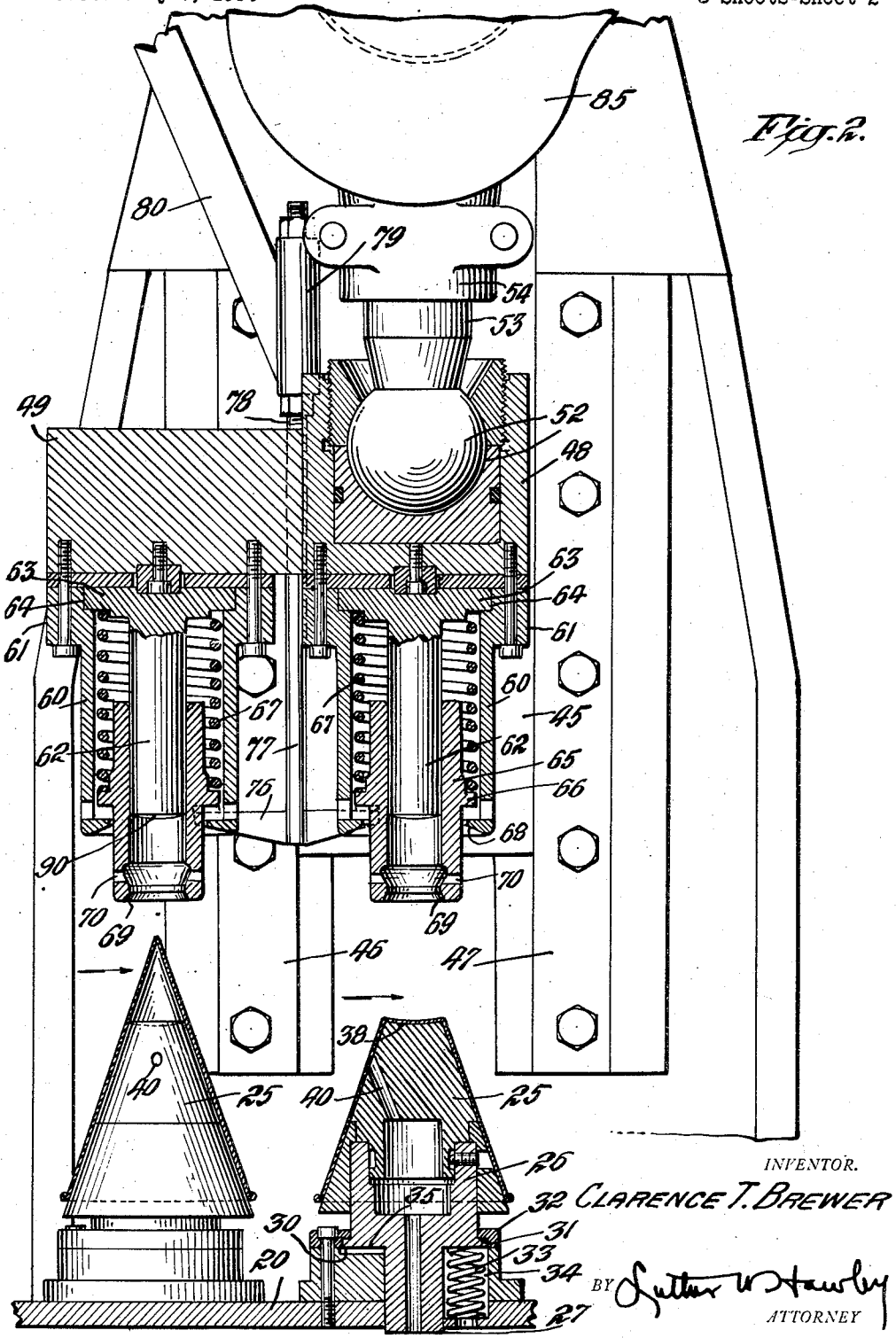
Fig. 2 is a sectional elevation, on an enlarged scale, showing the truncating punch and anvil and associated parts, with the cross head and punch mechanism in open position.

As shown particularly in Fig. 2, each of the housings 48 and 49 has bolted thereto a downwardly extending cylindrical shoe or casing 60, each casing having a flange 61 bolted to the housing. There is disposed within each shoe a punch 62 having a flange 63 disposed in a recess 64 in the base of the flange 61. There is mounted in each shoe 60 a sleeve 65 having intermediate its ends an outwardly extending flange 66 which is normally forced downwardly by a spring 67 housed in the shoe 60. The lower end of the sleeve 65 extends through an annular opening 68 in the bottom of the shoe 60 and the extending portion has at its lower end an inner conical surface 69 adapted to seat against the outer surface of the cup wall and clamp the cup to the anvil 25. Lateral openings 70 are formed in the sleeve above the lower end thereof and the inner surface of the sleeve above the openings 70 is preferably grooved so that the air surrounding the portion of the apex of the cup to be truncated or blunted will be vented and permitted to escape through the openings 70.

The vertical movement of the punches 62 is positively controlled by the crank actuated pitman movement but the vertical movement of the clamping sleeves is so controlled that the sleeves will move downwardly and clamp the cup before the punches engage the apex thereof and will be released from their clamping position and be moved upwardly within the casing 60 to a sufficient extent to permit the apex of the cup previously deposited on the support in station A to move beneath the clamping sleeve. The movement and control of the clamping sleeves will now be described.

Figure 3:
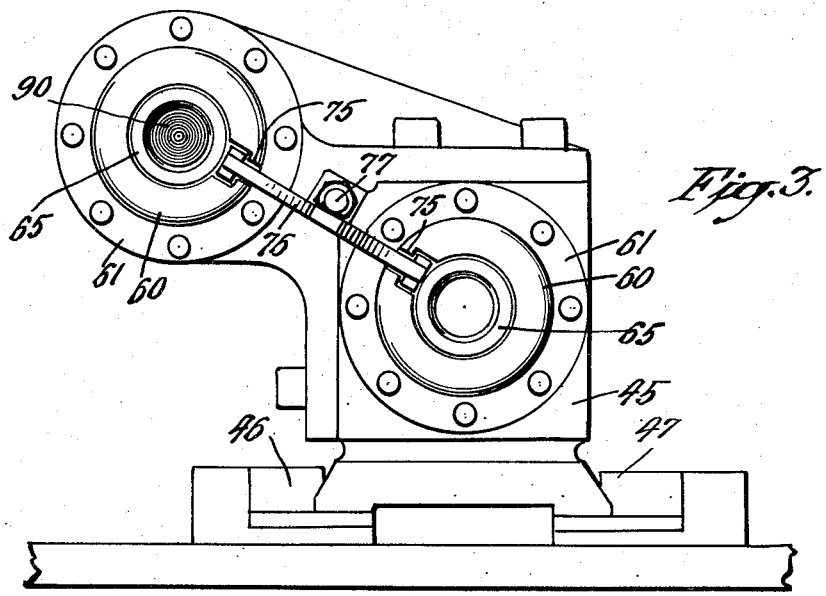
Fig. 3 is a bottom plan view of a portion of the mechanism shown in Fig. 1.
Figure 4:
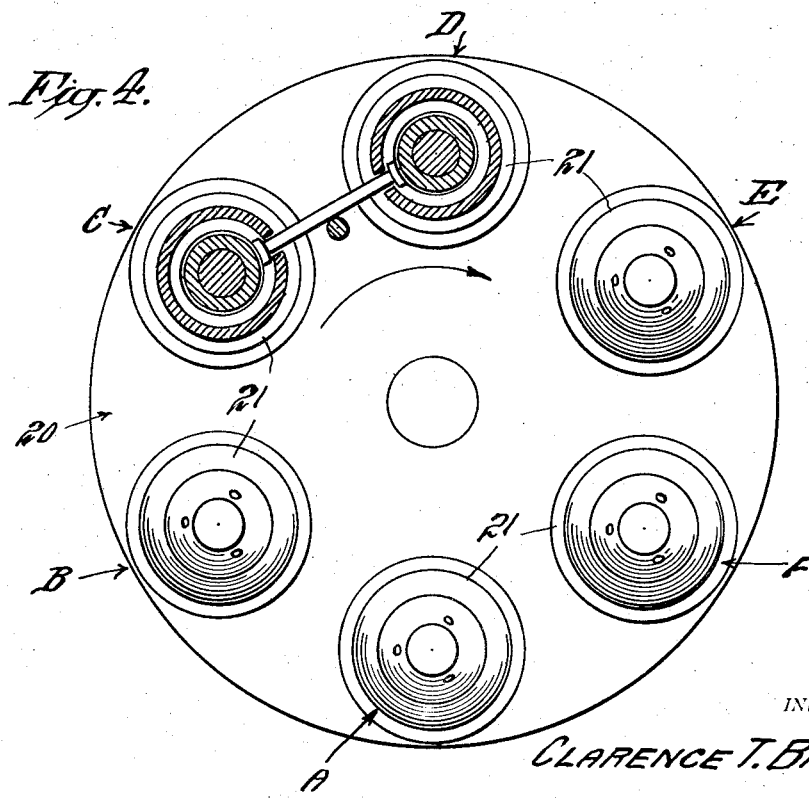
Fig. 4 is a plan view, partly in section, showing the turret cup supports or anvils thereon and illustrating in section the clamping sleeve control and a portion of the operating mechanism therefor.

As shown in Fig. 3, the walls of the shoes 60 which house the clamping sleeves and punches are slotted, as indicated at 75, to receive the ends of a cross arm or bar 76 mounted on the lower end of a rod 77. The upper end of this rod is threaded, as shown at 78 in Fig. 1, and has adjustably mounted thereon a sleeve 79, which is welded or fixedly secured to the lower end of a link 80. The upper end of the link 80 is connected to a lever 81 by a link pin 82, the lever 81 being mounted on a fixed fulcrum or pivot 83. A follower or roller 84 is mounted on the lever intermediate its ends and engages the periphery of a cam 85 which is mounted on the crank pin 56. The outer ends of the bar 76 are disposed beneath the flanges 66 on the clamp sleeve 65 and control the vertical movement of the sleeve under the action of the springs 67. Figs. 1 and 2 show respectively the extreme open and closed positions in the vertical movement of the clamping sleeve and punches. When the pitman 53 lowers the housing 48 and the connected housing 49, the sleeves 65 will move downwardly with the shoes 60 and the plungers 62. However, the sleeves will be permitted by the cam action and the control bar 76 to move into clamping position and clamp the cup on the mandrel or anvil support. The springs 67 are so gauged or so proportioned that the cup will be tightly held on the anvil, trapping air in the apex above the top of the anvil or the surface 38 thereof. However, the clamp will not prevent a slow escape of the air in the apex as the apex is forced downwardly to truncate the cup bottom. This trapping of the air and the slow escape thereof is important during the blunting operation since the successive folds which are formed in the cup walls will be ballooned out or will be prevented from collapsing during the blunting operation, to form corrugations substantially parallel to the cup axis.

Figure 23:
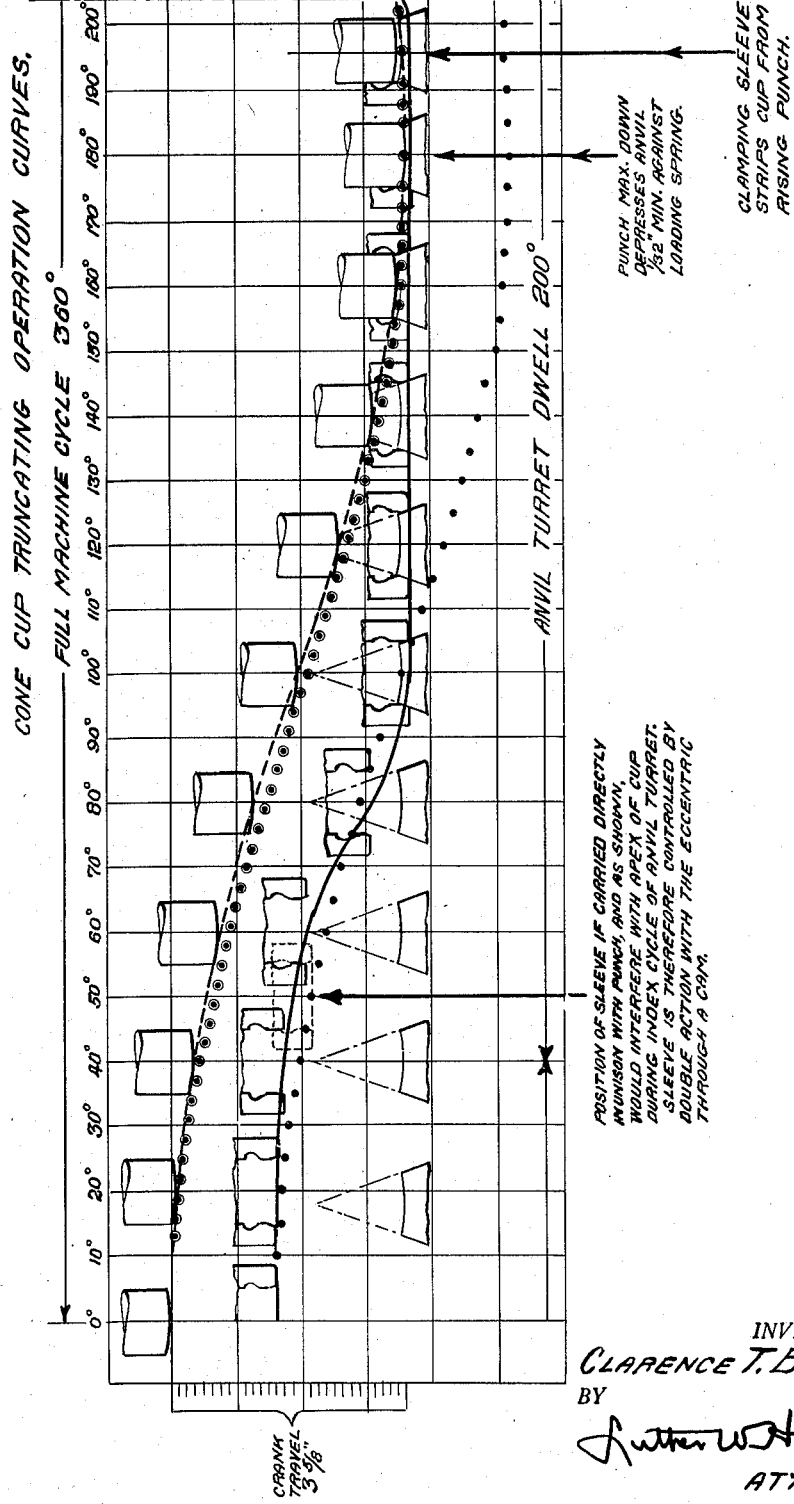
Fig. 23 is a fragmentary diagrammatic view showing the relative successive positions of the punch and cup clamping means through a portion of the cycle of operation.

Figs. 23 and 24 illustrate diagrammatically the relative positions of the punch and clamping sleeve throughout the cycle of movement thereof. These illustrations make clear the reason for controlling the clamping sleeve through the action of cam 85 instead of by the crank and pitman which control the movement of the punch or plunger. For instance, as shown in Fig. 23 at the 50° position, the sleeve, if controlled by the crank and pitman, would take the dotted line position and would interfere with the cup apex during the index cycle of the turret. However, the cam controls the movement of the sleeve and retards its lowering movement.

After the sleeve has reached the clamping position shown at approximately 100°, it remains in this position as the punch is lowered until at 180° the punch reaches its extreme lower position, as shown in Fig. 1.

Thereafter, at approximately 190° the sleeve rises to strip the cup from the rising punch. Thereafter, at approximately 210° the accelerated rise of the sleeve causes the punch to eject the cup from the clamping sleeve.

At the position indicated at 240°, the clamping sleeve is again shown in dotted lines in the position it would take if controlled by the crank and pitman, in which position it would interfere with the turret indexing.

In Figs. 23 and 24, as indicated by the legends on Fig. 24, the punch and cross head curve as developed by the crank and pitman is shown in dash lines. The crank pin curve is shown by the dots in circles. The clamping sleeve movement as controlled by the cam is shown in the full line curve and the positions the clamping sleeve would take if controlled by the crank and pitman is shown in the dotted curve.

In the particular form of the invention shown the bottom 90 of the punch 62 performing the first stage in the blunting operation is convex and spherical and has a plurality of serrations therein formed by downwardly extending spaced teeth 91. These teeth are preferably shaped substantially in the manner shown in Fig. 6 and the pitch of the teeth is determined by the thickness of the apex portion of the cup being truncated or blunted. This apex portion is preferably of uniform thickness and best results have been obtained by forming the apex with a uniform double thickness wall.

During the engagement of the apex portion of the cup by the serrated or corrugated under surface of the punch, the apex of the cup is first engaged in a centrally disposed hole or opening 92 and thereafter the points of the teeth 91 successively, circumferentially engage the wall of the cup, thereby maintaining axial alinement of the apex portion of the cup with the punch and anvil and controlling the apex and wall during the blunting operation in such a manner that uniform substantially equally spaced folds are formed therein. Also, the apex will be held by the central opening 92 and the teeth against lateral movement during the depression thereof by the punch. As the apex is depressed, the air surrounding the apex is permitted to escape or be vented through the openings 70 and the grooves 71. However, the air trapped within the apex will hold the apex in extended position against the pressure on the bottom of the punch, as shown in Fig. 8, and will force this portion against the plunger bottom whereby the apex will be controlled during the compression or blunting thereof and will be effectively prevented from lateral movement which would result in a crushed, uneven, blunted bottom. If the air trapped in the apex escapes too rapidly, the apex will not be held against the bottom of the punch and a condition such as that shown in Fig. 9 may be encountered.

The anvil upper surface 38 in both stations C and D is complementary in shape to the shape of the bottom of the punch and is preferably concave and spherical. At station D the lower end of the punch is smooth and convex and substantially spherical.

The punch and anvil construction hereinbefore described have been designed more particularly for truncating a conical cup having the apex portion of the cup to be truncated of substantially uniform multiple thickness, such, for instance, as a cup having a uniform double thickness apex portion. However, to insure the production of a bottom having a double thickness, it is desirable to have a slight overlap forming a third layer of material at the overlapping outer portions of the wall. It will be evident that if the same pressure is used on the overlapping third layer as that used on the double thickness of the bottom, that this pressure may cause fracturing or shearing at the overlapping edges thereof.

In order to overcome the condition above described, the anvil and/or the punch face may be provided with a relief area to compensate for the overlapping third layer of material, thus relieving the pressure and effecting a uniform pressure over the double thickness and the relatively small triple thickness of material.

In Fig. 11 the anvil 93 has a recess area 94 in the upper surface thereof adapted to accommodate the overlapping third layer of material in the bottom of the cup. The anvil 93, as shown in Fig. 11, has a notch 95 formed therein, and the cup as it is received through the delivery chute from the conical cup machine to the turret is rotated on the anvil until the inner seam of the cup engages the notch 95. This will insure the registration of the third layer overlap area with the relief area 94 in the anvil 93. The relief area may be incorporated in the punch or anvil or may be divided therebetween. Fig. 15 shows the relief area 94A in the punch 62A instead of in the anvil.

Figs. 16 and 17 illustrate a method of insuring the approximate proper positioning of the cup on the anvil. In thise figures the cup is ejected from the cup machine into a delivery chute 100 which delivers the cup to the anvil 21 on the turret table 20. The inner surface of the delivery chute 100 has inwardly extending, longitudinally, spaced ribs 101 formed therein, and these ribs engage the lip 102 at the open end of the cup and prevent the cup from turning axially as it passes through the chute. This, therefore, will insure the approximate proper positioning of the cup on the anvil. The cups are blown through the chute 100 by air blasts from pipes 103.

This proper positioning of the cup on the anvil may be accomplished by the structure shown in Figs. 13 and 14. The turret table 20 has anvils or cup supports 21 mounted thereon. In these figures it is assumed that the cup is delivered from the cup machine to station G and that the turret table rotates in the direction of the arrow. An inclined bar 96 is pivoted at 97 and is actuated in a clock-wise direction by a spring 98, the movement of the bar being limited by a stop pin 99. As the cup moves from the position G to the position H, the wall of the cup is engaged by the bar 96 and the cup will be rotated on the anvil during the movement of the cup from the position G to the position I. When the cup has been rotated to a sufficient extent to position the inner seam against the notch 95, the rotation of the cup will cease.

A modification of the arm or bar 96 shown in Figs. 13 and 14 is illustrated in Figs. 21 and 22.

In Fig. 21 is shown a tubular arm 115 pivoted at 116 and biased by spring 117. The outer end 118 of the tubular arm 116 is tapered and is slotted at 119. The other end of the tubular arm 115 is connected by a pipe 120 to a suction supply line. The cups will be rotated on the anvil as the end 118 of the arm 115 engages the cups.

It has been found desirable to form a straight or beaded portion at the lower end of the truncated wall in order to facilitate gripping the cup and removing the cup from a stack by cup holders. In order to accomplish this the punch and clamping sleeve structure shown in Fig. 18 may be utilized. In this figure the clamping sleeve has a conical inner surface 105 at the bottom end thereof but this surface merges into a substantially cylindrical surface 106. The bottom of the punch 107 is preferably substantially convex, as shown at 108, but the outer peripheral portion of the bottom may be flattened, as shown at 110. This form of punch and clamp produces a cup bottom such as that shown in Fig. 19.

Fig. 20 shows in section the truncated bottom formed by the machine or apparatus above described. It will be noted that the folds are substantially vertical or parallel to the cup axis and, as shown in Fig. 10, they are substantially concentric and circumferential.

From the foregoing specification it will be evident that the machine described by its operation positively circumferentially controls the cup apex during the truncating operation and by this control effects the formation of substantially uniform, circumferential, compacted corrugations in the cup bottom.

Moreover, means has been provided for insuring the uniform compression of a cup apex having more than one thickness.

Although certain specific embodiments of the invention have been particularly shown and described it will be understood that the invention is capable of modifica-

What I claim is:

1. Mechanism for truncating the apexes of conical cups comprising a solid, one-piece truncated anvil, means for clamping the apex end portion of the cup to the anvil with the apex projecting beyond the anvil end surface, a punch having a solid, one-piece end mounted to engage and compress the apex against the anvil, said punch and anvil having complementary opposed mating end surfaces adapted to compress the apex portion of the cup therebetween, said punch end having annular stepped serrations engageable successively with the apex and side wall to successively circumferentially roll fold and circumferentially control the cup wall during the truncating operation.

2. Mechanism for truncating the apexes of conical cups comprising a solid, one-piece truncated anvil die, means for clamping the apex end portion of the cup to the anvil before the punch descends with the apex projecting beyond the anvil end surface, thereby trapping air in the apex, a punch having a solid, one-piece end mounted to engage and compress the apex against the anvil, means for regulating the slow escape of air from the apex as the punch descends, said punch end having annular serrations engageable successively with the side wall to circumferentially control the side walls and to compress the apex against the anvil, and means for releasing air surrounding the apex as the punch compresses the apex.

3. Mechanism for truncating the apexes of conical cups comprising an anvil die, means for guiding and positioning the cups on the anvil in a specific angular relation with reference to the anvil axis, means for clamping the cup to the anvil with the apex projecting beyond the anvil end surface, a reciprocatable punch die mounted above the anvil and adapted to engage and compress the apex between the punch and anvil, one of said dies having a recess therein.

4. Mechanism for truncating the apexes of conical cups comprising an anvil die, means engageable with the cup for rotating the cup to position the cups on the anvil in a specific angular relation with reference to the anvil axis, means for clamping the cup to the anvil with the apex projecting beyond the anvil end surface, a reciprocatable punch die mounted above the anvil and adapted to engage and compress the apex between the punch and anvil, one of said dies having a recess therein.

5. Mechanism for truncating the apexes of conical cups having apexes varying in thickness comprising an anvil die, means including a conduit and ribs in the conduit for guiding and positioning the cups on the anvil in a specific angular relation with reference to the anvil axis, means for clamping the cup to the anvil with the apex projecting beyond the anvil end surface, a reciprocatable punch die mounted above the anvil and adapted to engage and compress the apex between the punch and anvil, one of said dies having a recess therein to receive a thicker portion of the truncated apex.

6. Mechanism for truncating the apexes of conical cups having apexes varying in thickness comprising a punch member and an anvil member, means for moving the punch member toward and away from the anvil members, one of said members having a sector-shaped recess in its end surface extending outwardly to the periphery thereof, and means for clamping a cup on the anvil member with the apex projecting beyond the end surface thereof, and means for positioning the cup on the anvil with a thicker portion of the apex registering with the recess.

7. Mechanism for truncating the apexes of conical cups comprising a conical, truncated anvil, a punch adapted to coact with the anvil in truncating the cup apex, a clamping sleeve movable independently of the punch and before the punch descends and movable toward the anvil to clamp the cup wall to the anvil, said sleeve having an outwardly, flared taper at the lower end thereof merging into a substantially cylindrical inner surface above the flared portion, said anvil and clamping sleeve being so proportioned that the end of the anvil wall projects into the cylindrical portion of the clamping sleeve when the conical cup is clamped in position for truncating and said punch having an arcuate bottom merging into a substantially flat outer edge portion.

8. Mechanism for truncating the apexes of conical paper cups comprising an anvil die, means to clamp a cup on the anvil, a punch die, and means to move the punch die toward and away from the anvil die to compress and truncate the cup apex, one of said dies having a depression in a portion of its end surface extending outwardly to the periphery thereof to accommodate an extra thickness of paper between said dies when the cup apex is compressed, and means for positioning the cup on the anvil with the extra thickness of paper in the apex registering with the recess.

9. Mechanism for truncating the apexes of conical cups comprising a solid, one-piece conical anvil having a truncated end, controlled means for clamping the apex portion of the cup to the anvil with the apex projecting beyond the end of the anvil, thereby trapping air in the apex, and a punch movable downwardly within the clamping means to engage and compress the apex, said controlled clamping means being designed to vent the air around the apex as the punch descends.

10. Mechanism for truncating the apexes of conical cups having a wall at the apex varying in thickness, comprising an anvil die, means for guiding and positioning the cups on the anvil in a specific angular relation with reference to the anvil axis, means for clamping the cup to the anvil with the apex projecting beyond the anvil end surface, a reciprocatable punch die mounted above the anvil and adapted to engage and compress the apex between the punch and anvil, one of said dies having a segmental recess therein to receive the thicker portion of the cup apex.

11. Mechanism for truncating the apexes of conical cups comprising a solid, one-piece anvil, means for clamping the apex portion of the cup to the anvil with the apex projecting beyond the anvil end, a punch mounted to engage and successively engage and circumferentially roll fold the apex wall against the solid end of the anvil, said punch and anvil having complementary opposing mating end surfaces adapted to compress the apex portion of the cup therebetween, and means for controlling the rate of movement of the punch and rate of depression of the apex and the tightness of clamping the cup that air trapped in the apex can escape slowly.

References Cited in the file of this patent

UNITED STATES PATENTS

| | | |
|---|---|---|
| 1,257,949 | Adelson | Feb. 26, 1918 |
| 1,987,362 | Cooley | Jan. 8, 1935 |
| 2,220,312 | Barbieri | Nov. 5, 1940 |
| 2,563,632 | Amberg | Aug. 7, 1951 |
| 2,673,496 | Amberg et al. | Mar. 30, 1954 |